United States Patent
Kesig et al.

(10) Patent No.: US 11,930,826 B2
(45) Date of Patent: *Mar. 19, 2024

(54) MIXING MACHINE WITH MOVABLE BOWL SUPPORT

(71) Applicant: ILLINOIS TOOL WORKS INC., Glenview, IL (US)

(72) Inventors: Ricky D. Kesig, Goodyear, AZ (US); Joel J. Everhart, Tipp City, OH (US); John A. Cremeens, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/851,806

(22) Filed: Jun. 28, 2022

(65) Prior Publication Data

US 2022/0354130 A1 Nov. 10, 2022

Related U.S. Application Data

(63) Continuation of application No. 16/229,043, filed on Dec. 21, 2018, now Pat. No. 11,425,913.

(60) Provisional application No. 62/619,967, filed on Jan. 22, 2018, provisional application No. 62/608,860, filed on Dec. 21, 2017.

(51) Int. Cl.
| | | |
|---|---|---|
| *A21C 1/14* | (2006.01) | |
| *A21C 1/02* | (2006.01) | |
| *A47J 43/044* | (2006.01) | |
| *A47J 43/07* | (2006.01) | |
| *A47J 43/08* | (2006.01) | |
| *B01F 27/805* | (2022.01) | |

(52) U.S. Cl.
CPC .............. *A21C 1/1455* (2013.01); *A21C 1/02* (2013.01); *A47J 43/0705* (2013.01); *B01F 27/805* (2022.01); *A47J 43/044* (2013.01); *A47J 2043/04463* (2013.01); *A47J 43/082* (2013.01)

(58) Field of Classification Search
CPC ...... A21C 1/1455; A21C 1/02; A47J 43/0705; A47J 2043/04463; A47J 43/082; A47J 43/044; B01F 7/1605; B01F 13/047; B01F 27/805; B01F 35/6052
See application file for complete search history.

(56) References Cited

U.S. PATENT DOCUMENTS

| | | |
|---|---|---|
| 1,767,002 A | 6/1930 | Meeker et al. |
| 1,781,321 A | 11/1930 | DeHuff |
| 2,019,911 A | 11/1935 | Meeker |
| 2,181,079 A | 11/1939 | DeHuff |
| 2,185,155 A | 12/1939 | Meeker et al. |
| 2,251,903 A | 8/1941 | Anstice et al. |
| 2,616,673 A | 11/1952 | Van Guilder |
| 3,422,330 A | 1/1969 | Swanke |
| 3,951,351 A | 4/1976 | Ernster et al. |
| 4,568,193 A | 2/1986 | Contri et al. |
| 4,697,929 A | 10/1987 | Muller |
| 4,819,460 A | 4/1989 | Obradovic |
| 4,822,172 A | 4/1989 | Stottmann |
| 4,860,816 A | 8/1989 | Bond |
| 4,893,942 A | 1/1990 | Stottmann |
| 5,000,578 A | 3/1991 | Artin et al. |
| 5,087,864 A | 2/1992 | Abel |
| 5,140,248 A | 8/1992 | Rowan et al. |
| 5,204,606 A | 4/1993 | Kuwahara et al. |
| 5,306,083 A | 4/1994 | Caldwell et al. |
| 5,348,393 A | 9/1994 | Pappas, Jr. |
| 5,472,276 A | 12/1995 | Ratermann et al. |
| 5,547,278 A | 8/1996 | Xie |
| 5,570,955 A | 11/1996 | Swartwout et al. |
| 5,653,535 A | 8/1997 | Xie et al. |
| 5,690,427 A | 11/1997 | Jennings |
| 5,736,828 A | 4/1998 | Turner et al. |
| 5,844,343 A | 12/1998 | Horst |
| 5,872,435 A | 2/1999 | Bolte et al. |
| 5,906,432 A | 5/1999 | Wade et al. |
| 5,934,802 A | 8/1999 | Xie |
| 5,955,861 A | 9/1999 | Jeong et al. |
| 5,957,021 A | 9/1999 | Meredith et al. |
| 6,066,074 A | 5/2000 | Marcinkiewicz |
| 6,313,597 B1 | 11/2001 | Elliott et al. |
| 6,429,612 B1 | 8/2002 | Kume et al. |
| 6,638,122 B1 | 10/2003 | Griffith, Sr. |
| 6,704,212 B2 | 3/2004 | Furukawa et al. |
| D490,271 S | 5/2004 | Short et al. |
| 6,750,629 B2 | 6/2004 | Shigemizu et al. |
| 6,756,757 B2 | 6/2004 | Marcinkiewicz |
| 6,883,959 B2 | 4/2005 | Donthnier et al. |
| 6,953,278 B2 | 10/2005 | Short et al. |
| 6,972,541 B2 | 12/2005 | Matsushiro et al. |

(Continued)

FOREIGN PATENT DOCUMENTS

| | | |
|---|---|---|
| DE | 3912361 | 10/1990 |
| DE | 60314785 T2 | 4/2008 |

(Continued)

OTHER PUBLICATIONS

PCT, International Search Report and Written Opinion, International Application No. PCT/US2018/066685; dated May 8, 2019, 15 pages.

*Primary Examiner* — Charles Cooley
(74) *Attorney, Agent, or Firm* — THOMPSON HINE LLP

(57) ABSTRACT

A food mixing machine includes a mixer body including a column and a head extending from the column. A rotatable output member extends downward from the head for receiving a mixer tool. A bowl support is mounted for vertical movement along the column between a lowered position away from the head and a raised position toward the head. A drive assembly is linked to selectively drive the rotatable output member. A user interface, including a touch-screen display, is located on the mixer body. A controller is associated with the user interface, wherein the controller is configured to communicate mixing machine condition information via the touch-screen display.

11 Claims, 16 Drawing Sheets

(56) References Cited

U.S. PATENT DOCUMENTS

| | | |
|---|---|---|
| 6,998,557 B2 | 2/2006 | McGuffin-Noll |
| 7,005,825 B2 | 2/2006 | Eguchi |
| 7,014,354 B2 | 3/2006 | Donthnier et al. |
| 7,207,711 B2 | 4/2007 | Huang |
| 7,273,315 B2 | 9/2007 | Huang |
| 7,384,187 B2 | 6/2008 | Blackburn |
| 7,387,430 B2 | 6/2008 | Short |
| 7,543,980 B2 | 6/2009 | Blackburn |
| 7,950,843 B2 | 5/2011 | Blackburn |
| 8,308,344 B2 | 11/2012 | Short |
| 11,425,913 B2 * | 8/2022 | Kesig ................. B01F 35/6052 |
| 2002/0093877 A1 | 7/2002 | Brunswick et al. |
| 2003/0165068 A1 | 9/2003 | Tomonaga |
| 2004/0008005 A1 | 1/2004 | Sakai et al. |
| 2004/0120213 A1 | 6/2004 | Short et al. |
| 2004/0120215 A1 | 6/2004 | Huang et al. |
| 2004/0208082 A1 | 10/2004 | Huang et al. |
| 2005/0122836 A1 | 6/2005 | Boyle et al. |
| 2005/0141340 A1 | 6/2005 | Donthnier et al. |
| 2006/0044935 A1 | 3/2006 | Benelli |
| 2006/0198240 A1 | 7/2006 | Short |
| 2007/0195641 A1 | 8/2007 | Schnipke |
| 2008/0221739 A1 | 9/2008 | Pryor |
| 2008/0291777 A1 | 11/2008 | Schnipke |
| 2011/0241590 A1 | 10/2011 | Horikoshi |
| 2012/0226764 A1 | 9/2012 | Philip |
| 2013/0293988 A1 | 11/2013 | Li |
| 2014/0070743 A1 | 3/2014 | Yoshida |
| 2014/0269154 A1 | 9/2014 | Kolar |
| 2014/0345474 A1 | 11/2014 | Trench |
| 2015/0023126 A1 | 1/2015 | Brown |
| 2015/0331051 A1 | 11/2015 | Maki |
| 2018/0059790 A1 | 3/2018 | Kolar |
| 2018/0242594 A1 * | 8/2018 | Huerta-Ochoa ...... H02P 29/024 |
| 2018/0242595 A1 * | 8/2018 | Huerta-Ochoa ...... A47J 36/321 |
| 2018/0361335 A1 * | 12/2018 | Bird ..................... A47J 43/0727 |
| 2019/0191718 A1 * | 6/2019 | Kesig ..................... B01F 27/805 |
| 2022/0354130 A1 * | 11/2022 | Kesig ..................... A21C 1/1455 |

FOREIGN PATENT DOCUMENTS

| | | |
|---|---|---|
| EP | 2448220 | 5/2012 |
| WO | WO 2005/112722 | 12/2005 |
| WO | WO 2016/145430 | 9/2016 |

* cited by examiner

*— 52*

| OCCURRENCE | MESSAGE | FREQUENCY |
|---|---|---|
| 01/01/2018 – 11:13 | Emergency Stop Active | 3 |
| 01/01/2018 – 11:12 | Emergency Stop Active | 2 |
| 01/01/2018 – 11:09 | Drive Fault | 10 |
| 01/01/2018 – 11:07 | Drive Fault | 9 |
| 01/01/2018 – 11:05 | Emergency Stop Active | 1 |
| 01/01/2018 – 11:04 | Driver Fault | 8 |

| Delete Alarm | Reset VFD | | Main Screen |

| OCCURRENCE | MESSAGE | FREQUENCY |
|---|---|---|
| 02/01/2018 – 12:22 | Bowl Cage Not Closed | 28 |
| 02/01/2018 – 11:12 | Emergency Stop Active | 19 |
| 02/01/2018 – 11:09 | Bowl Cage Not Closed | 27 |
| 02/01/2018 – 11:07 | Bowl Cage Not Closed | 26 |
| 02/01/2018 – 11:05 | Emergency Stop Active | 18 |
| 02/01/2018 – 11:04 | Bowl Cage Not Closed | 25 |

| Delete Alarm | Reset VFD | | Main Screen |

Fig. 13B

MIXING MACHINE WITH MOVABLE BOWL SUPPORT

TECHNICAL FIELD

This application relates generally to mixing machines commonly utilized for mixing food products such as dough, and more particularly to a mixing machine with an advantageous drive system and control system interface.

BACKGROUND

In commercial food mixing machines, the product being mixed is located in a bowl below the mixer head and a mixing tool extends downward from the mixer head. The bowl is typically located on a bowl support which can travel vertically. The mixing tool is driven in a planetary manner, rotating about a drive axis, and the drive axis moves or orbits in a circle.

Various drive systems and control systems have been used in such commercial mixers. Improvements to such systems would be desirable.

SUMMARY

A. In one aspect, a mixing machine includes a mixer body including a column and a head extending from the column. A rotatable output member extends downward from the head for receiving a mixer tool. A bowl support is mounted for vertical movement along the column between a lowered position away from the head and a raised position toward the head. A drive assembly is linked to selectively drive the rotatable output member. A user interface, including a touch-screen display, is located on the mixer body. A controller is associated with the user interface, wherein the controller is configured to communicate mixing machine condition information via the touch-screen display.

B. In one implementation of the mixing machine of preceding paragraph A, the controller is configured to selectively display one or more of: (i) banner messages upon occurrence of one or more machine events; or (ii) real-time torque load in graphical form during mixing operations of the mixing machine.

C. In one implementation of the mixing machine of preceding paragraph B, the display of real-time torque load in graphical form shows load percentage to full rated load.

D. In one implementation of the mixing machine of any of preceding paragraphs A-C, the controller is configured to provide multiple levels of feature access including at least an operator level, a supervisor level and a service level, where at least the supervisor level and the service level are accessed by requiring user input of a security code via the user interface.

E. In one implementation of the mixing machine of any of preceding paragraphs A-D, the controller is configured to selectively display pop-up window messages on the touch-screen display without removing or obscuring standard display information.

F. In one implementation of the mixing machine of any of preceding paragraphs A-E, the controller is configured to selectively display verbal messages indicating each of an emergency stop condition, a bowl not up condition, a bowl not in place condition and a bowl cage not closed condition.

G. In one implementation of the mixing machine of any of preceding paragraphs A-F, the controller is configured to selectively enable access to, and display on the user interface of, a log file of fault occurrences.

H. In one implementation of the mixing machine of any of preceding paragraphs A-G, the machine includes a prime mover that is connected for powered movement of the bowl support back and forth between the raised position and the lowered position under operator control via a physical or graphic bowl drive actuation input; and the controller is configured such that, during triggering of the bowl drive actuation input to move the bowl support from the raised position to the lowered position, the controller generates an interrupt before the bowl support reaches the lowered position and a bowl condition message is automatically displayed on the user interface advising the operator to unlock a bowl on the bowl support.

I. In one implementation of the mixing machine of preceding paragraph H, the machine includes a sensor for indicating location of the bowl support, wherein the controller is configured to trigger the interrupt when the sensor indicates that the bowl support has moved down to a specified position between the raised position and the lowered position.

J. In one implementation of the mixing machine of any of preceding paragraphs H or I, a bowl support stroke distance is defined as a vertical distance between the raised position and the lowered position, and the specified position is at a set distance that is below the raised position, wherein the set distance is between about 40% and about 60% of the bowl support stroke distance.

K. In one implementation of the mixing machine of any of preceding paragraphs H-J, the machine includes a sensor for sensing whether the bowl is locked on the support, wherein the controller is configured to prevent further downward movement of the bowl support from the specified position unless the sensor indicates that the bowl is unlocked.

L. In one implementation of the mixing machine of preceding paragraph K, the bowl is pivotably mounted to the bowl support for movement between a closed position and an open position, and the sensor identifies the open position as the bowl being unlocked.

M. In one implementation of the mixing machine of any of preceding paragraphs H-J, the controller is configured such that an operator must provide a bowl condition message acknowledgment input via the user interface to enable further downward movement of the bowl support from the specified position.

N. In one implementation of the mixing machine of any of preceding paragraphs A-M, the user interface includes a housing assembly with housing frame part, a housing body insert part and a housing sheet member, wherein a front side of a perimeter portion of the housing sheet member sealingly engages a rear edge of a flange the defines an opening through the housing frame part, wherein a front side of a peripheral flange on the housing body insert part sealingly seats against a rear side of the housing sheet member, wherein the housing sheet member includes an opening that receives a body of the touch-screen display, and a rear side of a perimeter portion of the touch-screen display sealingly seats against the front side of the housing sheet member.

O. In one implementation of the mixing machine of any of preceding paragraphs A-M, the user interface includes a housing assembly unit that forms an internal compartment, wherein the internal compartment is sealed from a front or exposed side of the housing assembly unit for protection of electrical connections to the interface components during user interface cleaning, where the electrical connections are within the internal compartment.

P. In another aspect, a mixing machine includes: a mixer body with a head having a rotatable output member for receiving a mixer tool. A bowl support is mounted for vertical movement along the mixer body between a lowered position away from the head and a raised position toward the head. A drive arrangement is linked to drive the mixer tool, the drive arrangement including a motor with a nominal speed in excess of 1200 RPM.

Q. In one implementation, the mixing machine of preceding paragraph P is a mixing machine according to any one of paragraphs A-O.

R. In one implementation of the mixing machine according to either preceding paragraph P or Q, the drive arrangement includes a VFD with sensorless vector type drive.

S. In one implementation of the mixing machine according to any of preceding paragraphs P-R, the motor is a four pole motor that provides higher torque for a plurality of set speeds as compared to use of a motor with six poles or more.

T. In one implementation of the mixing machine according to any of preceding paragraphs P-S, the drive arrangement includes a VFD with hertz selections.

The details of one or more embodiments are set forth in the accompanying drawing and the description below. Other features, objects, and advantages will be apparent from the description and drawing, and from the claims.

BRIEF DESCRIPTION OF THE DRAWINGS

FIGS. 11A, 11B, 12, 13A, 13B, 14 and 15 show exemplary interface screen examples for the mixing machine.

DETAILED DESCRIPTION

Figure 1:
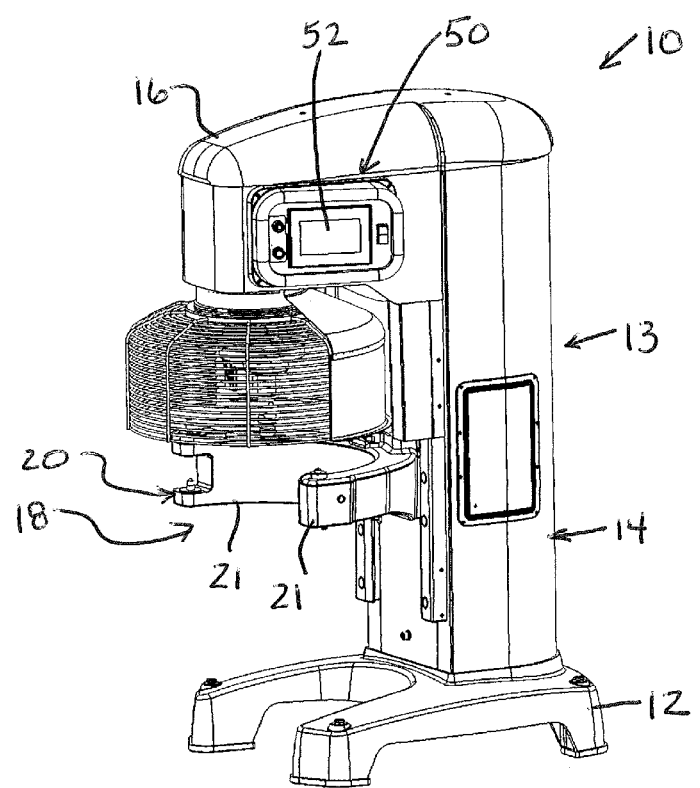
FIG. 1 shows a perspective view of a mixing machine.
Figure 2:
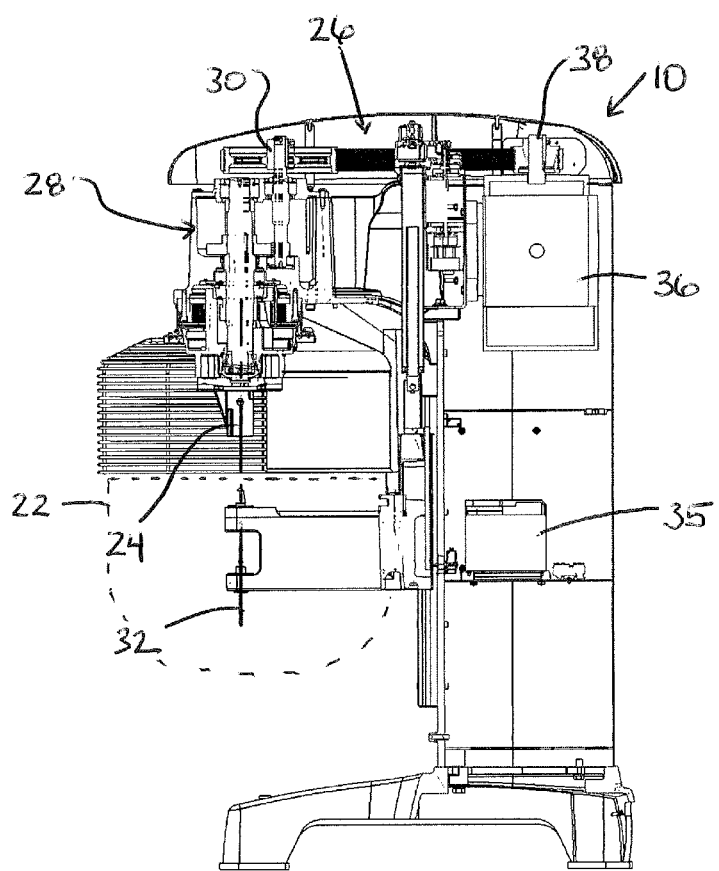
FIG. 2 shows a side elevation of the mixing machine with some internal components also shown.
Figure 3:
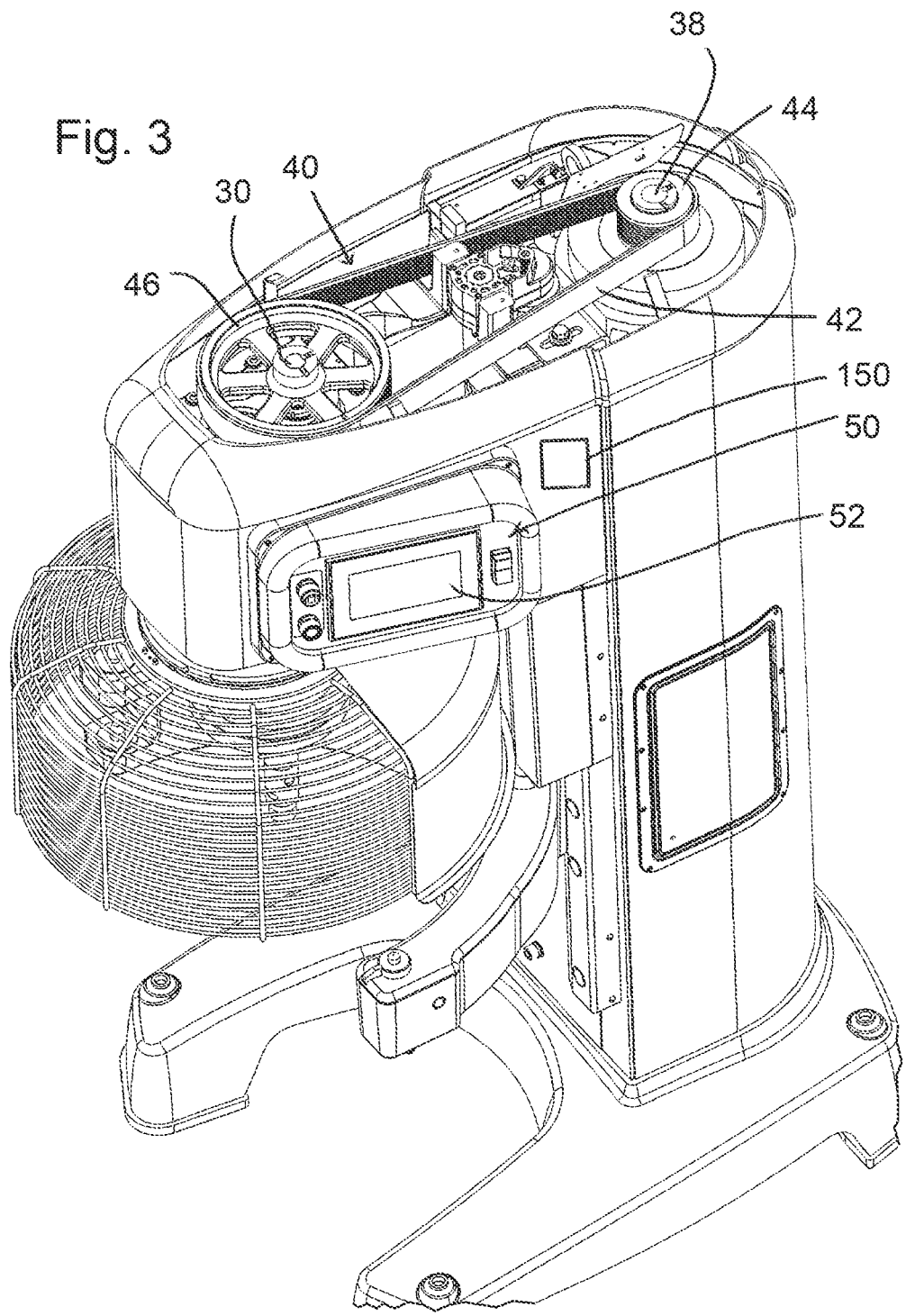
FIG. 3 shows a partial enlarged perspective view of the mixing with top cover partially broken away.
Figure 4:
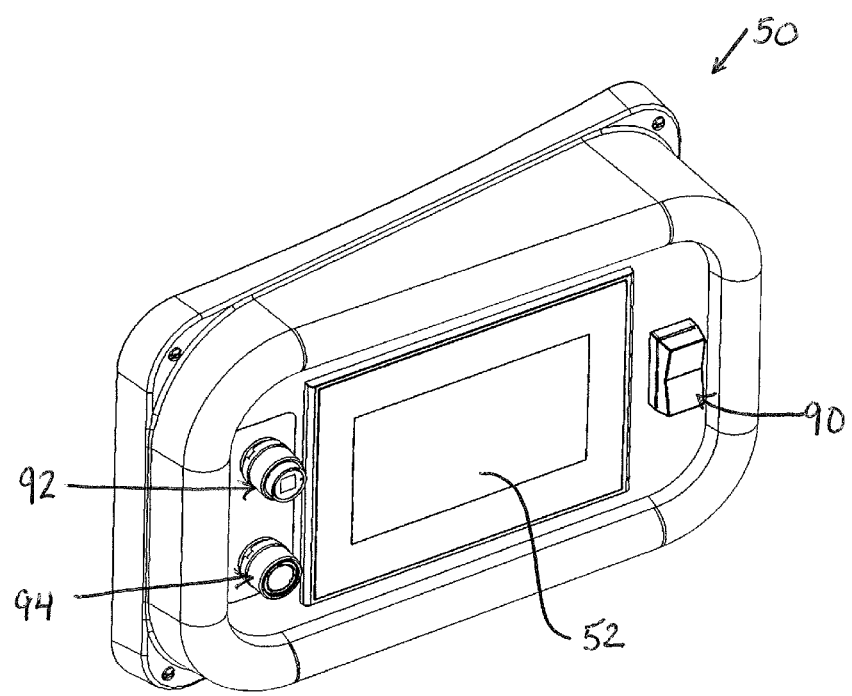
FIGS. 4 and 5 show perspective views of an HMI assembly of the machine.
Figure 5:
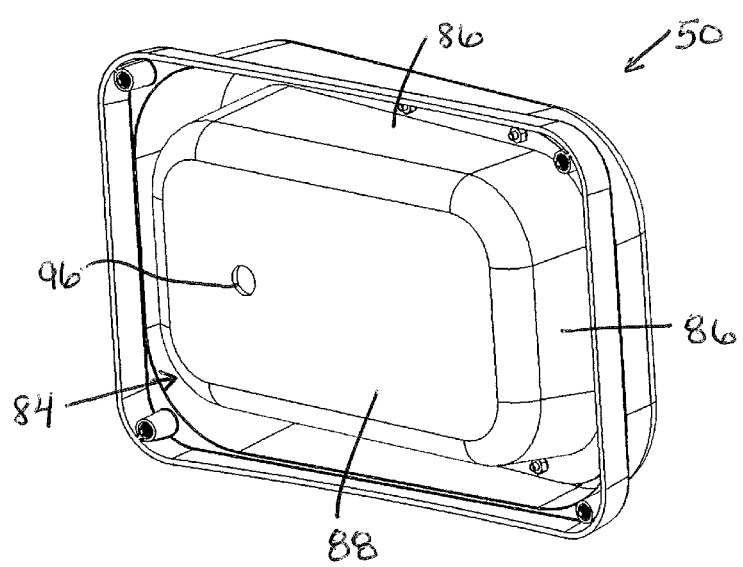
Figure 6:
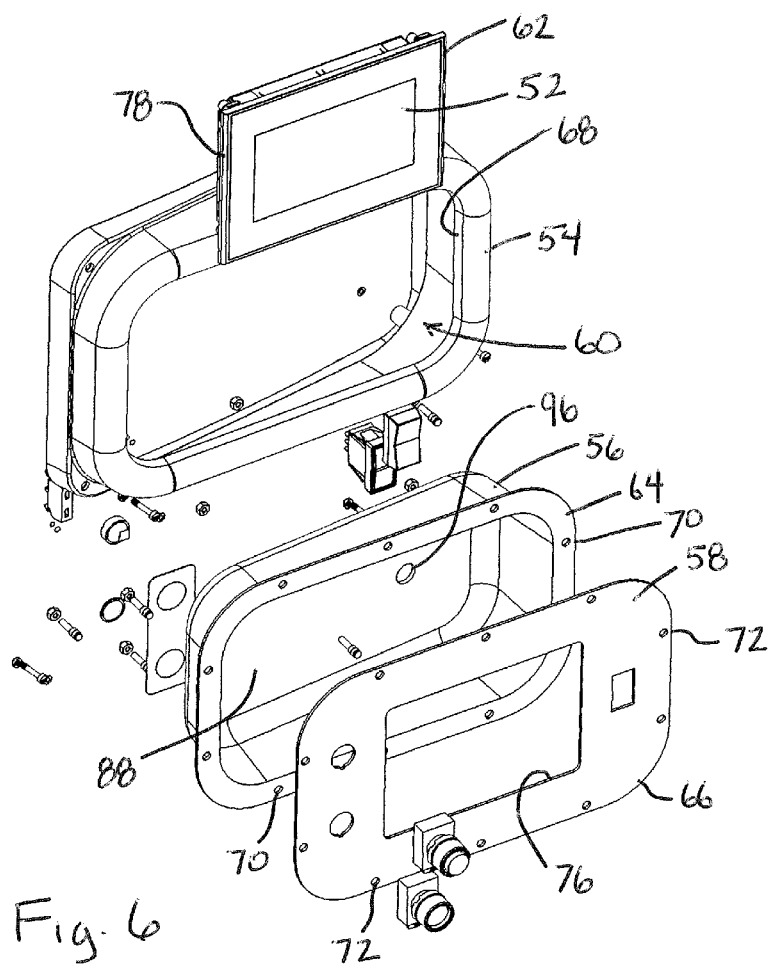
FIG. 6 shows an exploded perspective of the HMI assembly.
Figure 7:
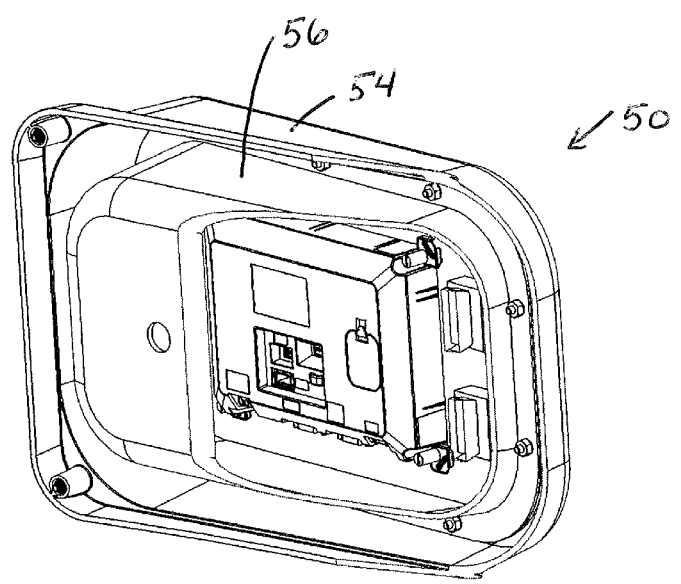
FIG. 7 shows a rear perspective of the HMI assembly with a wall partially broken away.
Figure 8:
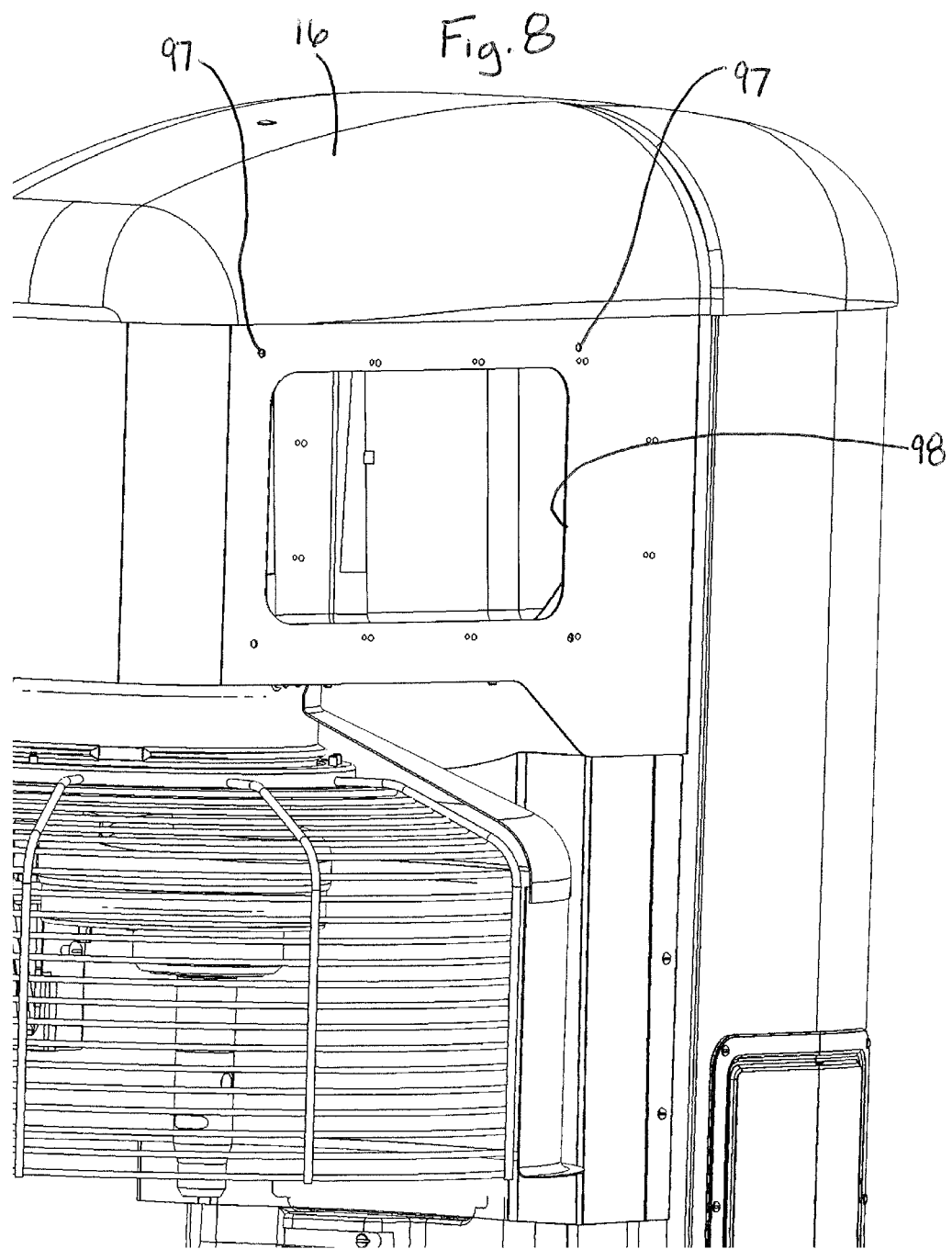
FIG. 8 shows an enlarged partial view of the head of the mixing machine with HMI not shown.
Figure 9:
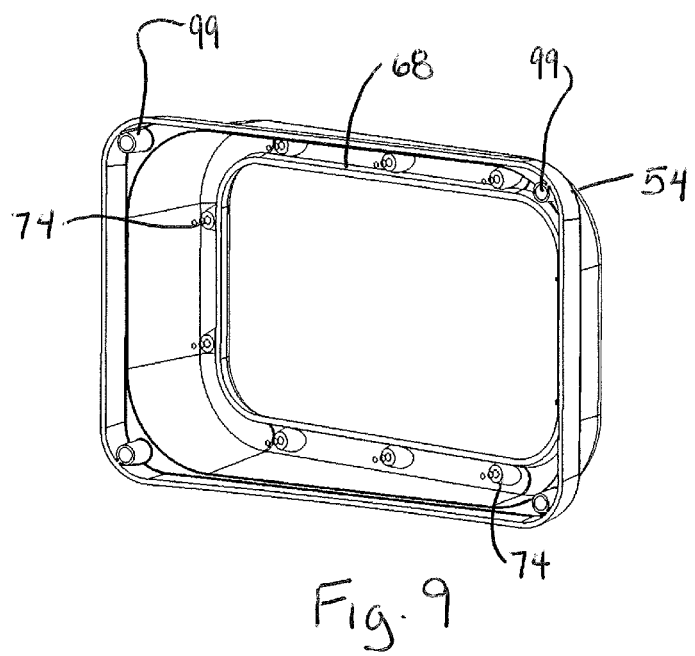
FIG. 9 shows a rear perspective of a frame part of the HMI housing.
Figure 10:
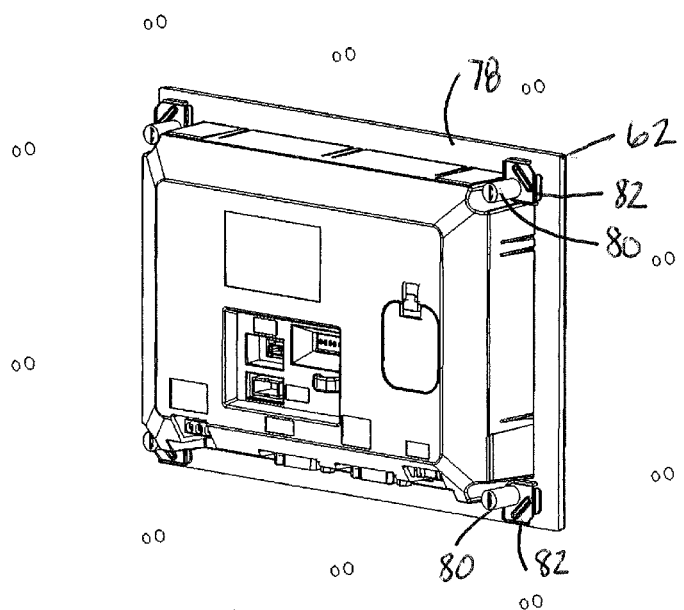
FIG. 10 shows a rear perspective of the touch-screen display unit of the HMI assembly.

Referring to FIGS. 1-3, a mixing machine 10 is shown and includes a base 12. A mixer body 13 includes a column or pedestal 14 extending upward from the base 12, and a head 16 extending outward from the column 14 and over a bowl receiving location 18. The bowl receiving location 18 may be defined by a bowl support 20 mounted along a front of the mixer body 13, where the bowl support 20 has spaced apart curved arms 21 defining a curved shape to match the bowl 22 (shown schematically in FIG. 2). The head 16 includes a downwardly extending rotatable output member 24 that can receive a mixer tool such as dough hook, whisk or other tool. The head 16 and upper portion of the column 14 typically include a detachable cover for enclosing the components. By way of example, the mixing machine 10 may be of any common commercial size (e.g., mixer bowl sized for 20 quart capacity and mixing machine potentially sized to enable positioning on a countertop, or mixer bowl sized for larger capacity, such as 40 quart, 60 quart, 80 quart or even up to 140 quart capacity, and the mixing machine sized as a floor model).

The mixing machine includes a drive assembly 26 for effecting rotation of the rotatable output member 24. In the illustrated machine, the drive assembly is formed in part by a gear system 28 within the head 16 and having an upwardly extending input drive shaft 30. In the case of a planetary mixer, the gear system 28 may take the form of a planetary gear system, in which case the rotatable output member 24 rotates about its own axis 32, with the axis 32 orbiting around a central bowl axis (not shown). The drive assembly also includes a drive motor 36 that is mounted and located in line with the column 14 and includes an upwardly extending output shaft 38. A drive linkage 40 connects the motor output shaft 38 to the gear system input shaft 30 and may be formed by the illustrated belt 42 and pulleys 44 and 46. Alternative drive linkages could take the form of chain and sprocket combinations, additional gearing and/or or bar-type linkages.

The drive system includes a variable frequency drive (VFD) 35 associated with motor 36. The motor 36 may be a 5 hp 4 pole motor with 5 hp HD drive unit, with a nominal speed of 1800 RPM. Utilizing less than 6 poles on the motor draws less current, and thus results in less heat generation. The use of a nominal speed above 1200 RPM (e.g., above 1500 RPM) results in more torque for a set speed, and also a higher speed fan, resulting in cooler running during operation. Material improvements in torque are provided. The mixer may include preset mix speeds selected to be suitable for the typical uses of the mixer. By way of example, four preset mix speeds may be used in the case of 60 quart, 80 quart and 140 quart mixers. In such a case, the 5 hp 4 pole motor/5 hp HD drive unit achieve advantageously high torque, as reflected in Tables 1, 2 and 3 below:

TABLE 1

| 60 Quart Mixer | | | |
|---|---|---|---|
| Speed Setting | RPM | Beater Torque (in-lb) | Torque Per Qt Ratio |
| 1 | 71 | 2363 | 39.4 |
| 2 | 123 | 2363 | 39.4 |
| 3 | 208 | 1508 | 25.1 |
| 4 | 364 | 864 | 14.4 |

TABLE 2

| 80 Quart Mixer | | | |
|---|---|---|---|
| Speed Setting | RPM | Beater Torque (in-lb) | Torque Per Qt Ratio |
| 1 | 54 | 3807 | 47.6 |
| 2 | 95 | 3807 | 47.6 |
| 3 | 179 | 2625 | 32.8 |
| 4 | 315 | 1491 | 18.6 |

TABLE 3

140 Quart Mixer

| Speed Setting | RPM | Beater Torque (in-lb) | Torque Per Qt Ratio |
|---|---|---|---|
| 1 | 46 | 6767 | 48.3 |
| 2 | 79 | 6767 | 48.3 |
| 3 | 149 | 4230 | 30.2 |
| 4 | 262 | 2398 | 599.5 |

The VFD may be an industrial duty sensorless vector type drive that automatically changes the power configuration to accommodate load in order to maintain set speed. For example, the drive may vary power to assure operation within ±3 RPM of set speed or better (such as within ±2 RPM of set speed, or within ±1 RPM of set speed). The VFD includes a current overload capability of 200% rated power in excess of fifteen seconds (e.g., in excess of twenty seconds, such as thirty seconds). The VFD may include an on-board programmable logic controller (PLC) that facilitates interface with machine controls, and may include diagnostic software. The VFD may also include a Safe Torque Off (STO) feature that is used to prevent unexpected motor rotation in the event of an emergency while the drive remains connected to the power supply. When the STO feature is activated, the torque power cannot reach the drive, thus stopping and preventing any motor shaft rotation.

The mixing machine may include an industrial duty human machine interface (HMI) 50 with touch-screen 52, color display. The HMI may be rated with IP65 ingress protection rating (against dust and low pressure water jets). FIGS. 4-10 show views of the HMI assembly, or portions of the assembly. The assembly includes a display housing formed by a primary housing frame 54, a housing body insert 56 and a housing sheet 58. The primary housing frame 54 is mounted to the side of the mixer head and provides a framed opening 60 into which the touch-screen display unit 62, housing body insert 56 and housing sheet 58 fit. The housing sheet 58 mounts to a perimeter flange 64 at the front of the housing body insert 56, and the front perimeter portion 66 of the housing sheet is pressed against the rear edge of a rearwardly extending flange 68 of the framed opening 62. A set of fasteners pass through the aligned set of openings 70 and 72 on the body insert and sheet respectively, with the fasteners engaging into corresponding rearwardly extending fastener posts 74 of the housing frame 54 to secure the three parts of the display housing together in a manner that provides a tight seal between the front of the housing sheet 58 and the rear edge of the flange 68.

The housing sheet 58 includes an opening 76 into which the rear portion of the touch-screen display unit 62 fits, such that a rear side of a perimeter portion 78 of the unit 62 seats in a sealing manner against the front surface of the housing sheet 58 at the perimeter of the opening 76. The housing sheet 58 acts as a face plate of the HMI assembly and includes openings for mounting of the interface components (display, buttons, knobs). The housing sheet may, in one example, be of sufficiently resilient material to provide the sealing with the rear edge of flange 68 and sealing with the rear side of perimeter portion 78 of the display unit. Alternatively, where the housing sheet is a more rigid material, or to enhance sealing, separate gaskets (e.g., compressible o-rings, or more planar gasket members) may be provided between the sheet member front surface and the rear edge of flange 68 and between the sheet member front surface and the rear side of perimeter portion 78 for sealing purposes. The touch-screen display unit includes plurality of rearwardly extending mount posts 80 that extend within the housing sheet opening 76 near the opening perimeter such that a set of clamping elements 82, which are slidable on the posts 80 toward the rear side of perimeter portion 78, can secure the display unit 62 to the housing sheet 58, with the clamping elements 82 engaging with the rear side of the housing sheet 58 at the perimeter of the opening 76. For assembly purposes, the display unit 62 may be secured to the housing sheet 58 before the housing sheet 58 is secured to the housing body insert 56 and housing frame 54.

Notably, the housing body insert 56 includes an enclosed and surrounding rear portion 84 with side walls 86 and a rear wall 88 that define an internal volume to receive the rear side of the display unit 62 as well as the other interface components, including rocker switch assembly 90 and push-button or dial-knob assemblies 92 and 94. This internal volume, along with the sealing between the housing sheet 58 and both the display unit 62 and housing frame 54, provide a well-sealed compartment for the electronics of the HMI. A small opening 96 is provided in the rear wall 88 for passage of wiring that runs to the electrical connectors of the HMI components. This HMI assembly arrangement provides an IP65 HMI rating that enhances mixer sanitation by facilitating cleaning.

The housing frame 54, housing body insert 56 housing sheet 58, touch-screen display unit 62, rocker switch 90 and dials/knobs 92, 94 are pre-assembled together into a unit (e.g., per FIGS. 4 and 5) with electrical wiring (not shown) extending through the rear wall opening 96. The wiring is then fed into the mixer body (through opening 98 (FIG. 8)) for making electrical connection. The HMI assembly unit is then mounted to the side of the mixer head, in alignment with the opening 98, using fasteners that pass through openings 97 in the mixer head panel and engage into mount posts 99 at the back side of the housing frame 54. Notably, the pre-assembled HMI assembly unit itself forms a compartment (internal of the volume of the rear portion 84 of the body insert) that is well sealed from the front side for protection of both the electrical connections to the interface components and the components themselves (e.g., during cleaning of the interface on the mixing machine).

In an alternative embodiment of the HMI, an internal volume is provided between the mixer head skin (e.g., stainless steel sheet) and the HMI housing to receive and protect the electronic controls for the touch-screen display unit and other interface components. The housing may be secured to the mixer head by one or more fasteners (e.g., bolts) that pass from the interior of the mixer through holes in the mixer head skin and into fastener receiving ribs on the housing. A gasket may be positioned between the mixer head skin and the display housing for sealing purposes. Only a single, small gasketed opening is provided through the mixer head skin, from the internal volume to the internals of the mixer head for running power and communication lines from the interface electronics to the VFD.

Figure 11A:
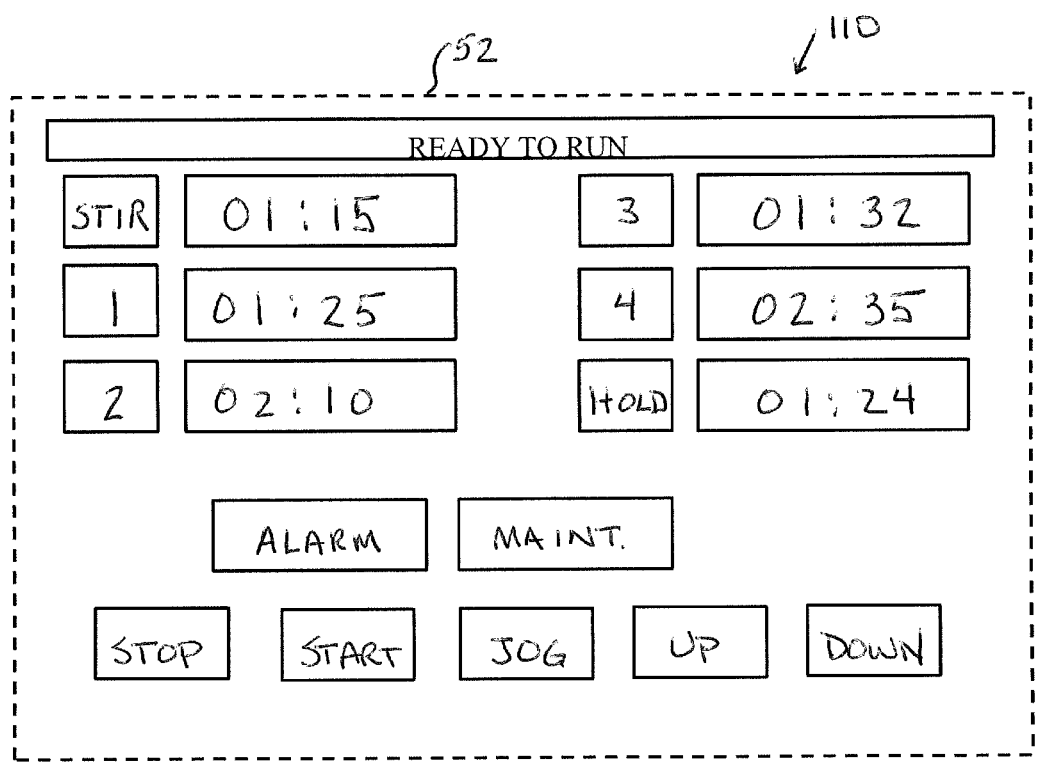
Figure 11B:
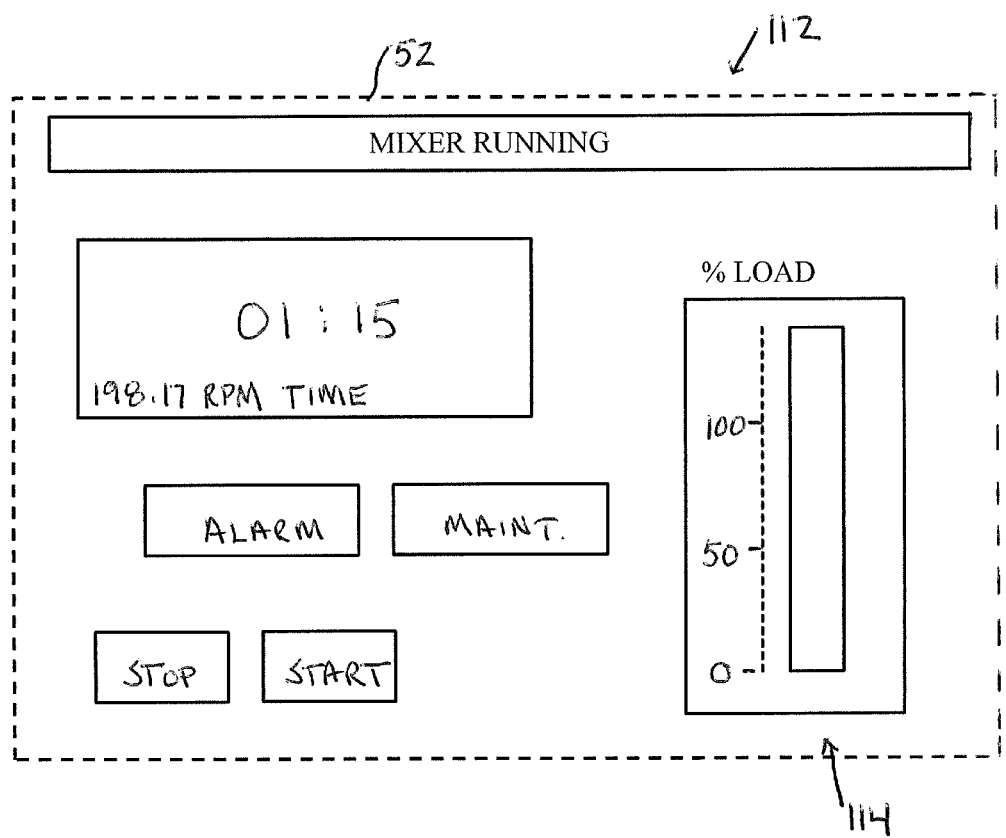

FIGS. 11A-11B show one set of an exemplary main screen interface 110 and main run screen interface 112. Note that the main run screen interface 112 includes a % Load bar graph display 114 that enables the operator to see the loading on the motor/drive during mixing operations, with changes in loading shown in real-time. Using this display, operators may learn opportunities for enhancing mix operations. For example, if an operator notes that the mixing load is always relatively low, the operator may recognize that additional ingredients could be added during the mix, without adversely affecting the batch, enabling the operator to define and implement larger batch sizes. The ability to modify the interface to meet operator needs is advantageous.

The HMI may be implemented with multiple levels of security or access for selective access to certain machine functions. For example, three levels are possible (1) operator level, (2) facility management/supervisor level, and (3) service level. At the operator level, which may be accessible without any required password, the standard machine operating functions may be enabled and accessible. At the facility management/supervisor level, which may be accessed by password or other security code, certain operational settings may be accessible for modification, such as set speeds or recipes stored in memory. At the service level, which may be accessed by password or other security code, deeper code modifications may be accessible, as well as diagnostic fault logs and other stored operational data.

Figure 12:
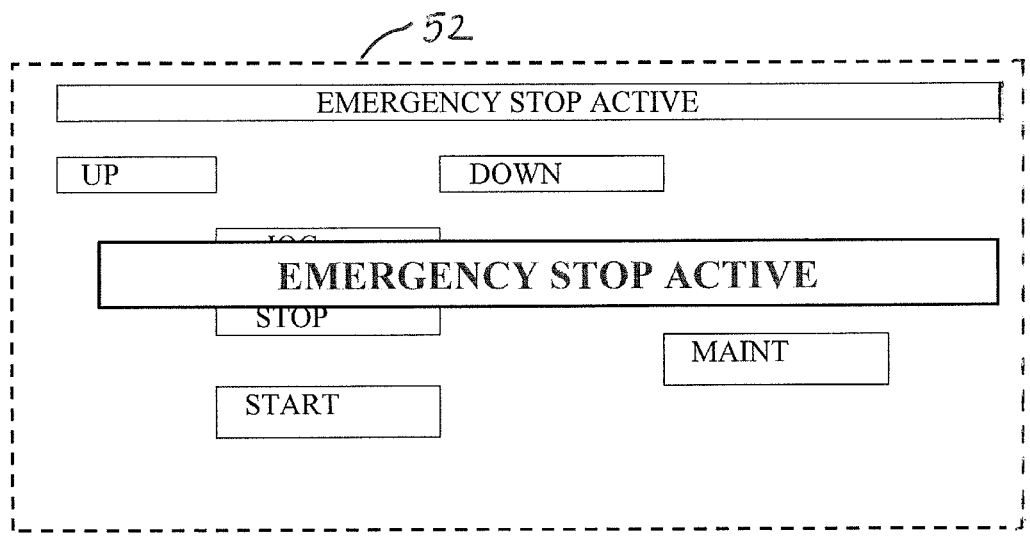

The HMI and related control system may enable mixer status monitoring and communication. For example, FIG. 12 shows an exemplary interface in the event of an emergency stop, with banner communications at the top and overlaying the central portion of the screen display. Other typical communications displayed in such manner may be Bowl Not Up, Bowl Not In Place and Bowl Cage Not Closed. Such operator notices enhance operator use. Various banner messages are possible, as is the ability to flash portions of the screen in different colors as operator indicators. In addition, countdown timer display is possible. The ability to produce pop-up message windows that do not overlay standard display information of the screen is also possible. The machine controller may also be configured to enable selection and display of training videos or service/maintenance videos.

An exemplary controller 150 is shown generically in FIG. 3. However, as used herein, the term controller is intended to broadly encompass any circuit (e.g., solid state, application specific integrated circuit (ASIC), an electronic circuit, a combinational logic circuit, a field programmable gate array (FPGA)), processor(s) (e.g., shared, dedicated, or group—including hardware or software that executes code), software, firmware and/or other components, or a combination of some or all of the above, that carry out the control functions of the machine or the control functions of any component thereof. Portions of the controller thus may be incorporated into the HMI display unit electronics and/or the VFD of the machine.

The controller may also operate with more advanced notice functions via wireless communications, such as e-mail or other notices regarding necessary maintenance, service or fault conditions. Communication of such messages to remote computer systems or devices facilitates service and maintenance. In addition, the ability to remotely access the mixing machine for diagnostics and monitoring from the corporate level may also be provided.

FIGS. 13A and 13B show exemplary fault log history interface screens. The screens show the date and time of each fault, the type of fault and the cumulative frequency of that fault type that the particular instance of the fault represents.

Figure 14:
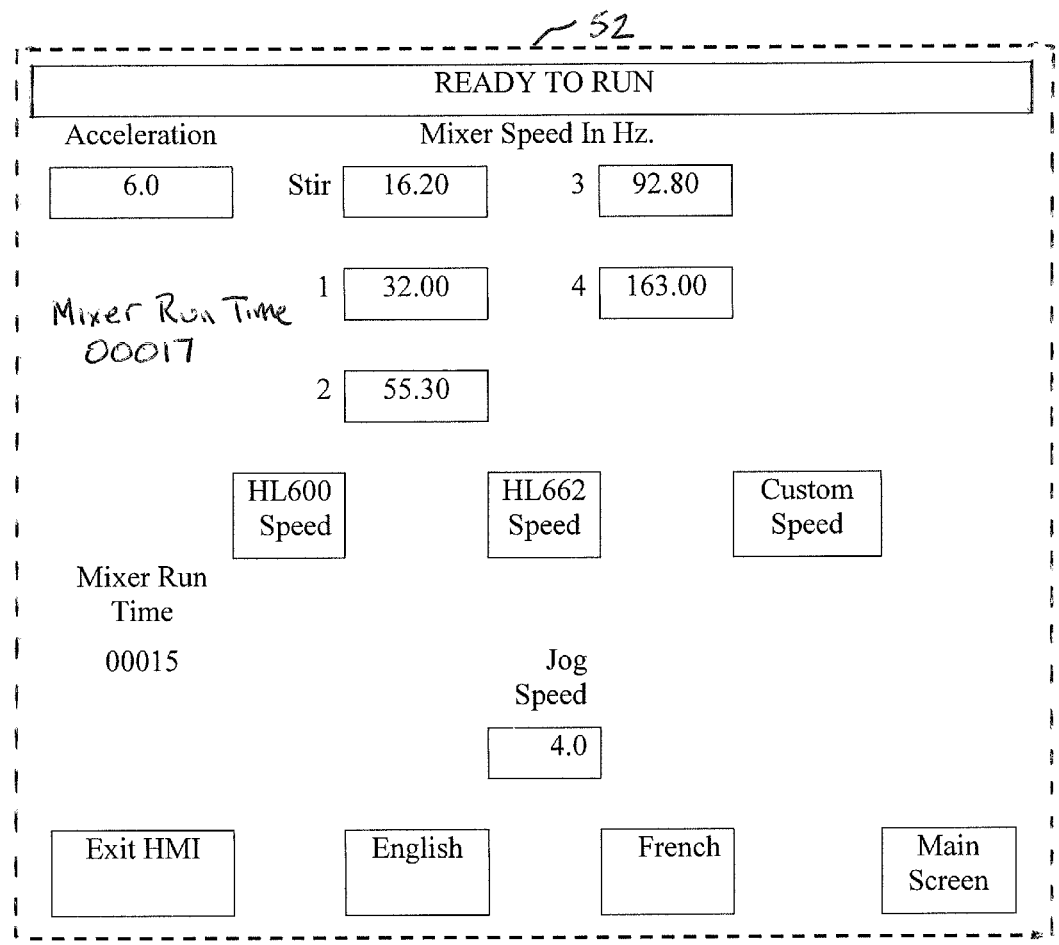

FIG. 14 shows an exemplary maintenance interface screen, which includes a cumulative mixing machine run time display field. This interface also shows the ability to:
  a. select and adjust various motor speeds,
  b. select and adjust the acceleration rate of the motor (e.g., where the rate is specified as a time period to accelerate from 0 to a set speed),
  c. establish custom speeds,
  d. implement multiple groups of speed settings (e.g., according to whether the mixer is a Model HL600 or Model HL662 in the illustrated example),
  e. select interface language,
  f. select and adjust jog speed, and
  g. select between two preset main screen interfaces (e.g., having different display configurations).

With respect to the jog function, in the present machine this function is implemented such that movement of the mixing implement for jog purposes is linked to continued actuation of the displayed jog button. This feature, coupled with a relatively slow jog speed, enables an operator to readily position the mixing implement at any desired orbital location within the bowl.

With respect to acceleration time, the adjustability of this parameter is particularly useful for operators to facilitate appropriate mix without ingredient blow out (e.g., the acceleration time can be set suitable for specific ingredients to assure that the mixing tool does not force ingredients upward and out of the bowl). Notably, the acceleration time itself is part of any set mix time (e.g., if the set mix time for a speed is 1 minute and 30 seconds, and the acceleration time is six seconds, the six seconds of acceleration form part of the 1 minute and 30 second mix time).

The controller may also enable setting of various recipes (e.g., made up of multiple speeds with corresponding mix times, which will be implemented in sequence).

Figure 15:
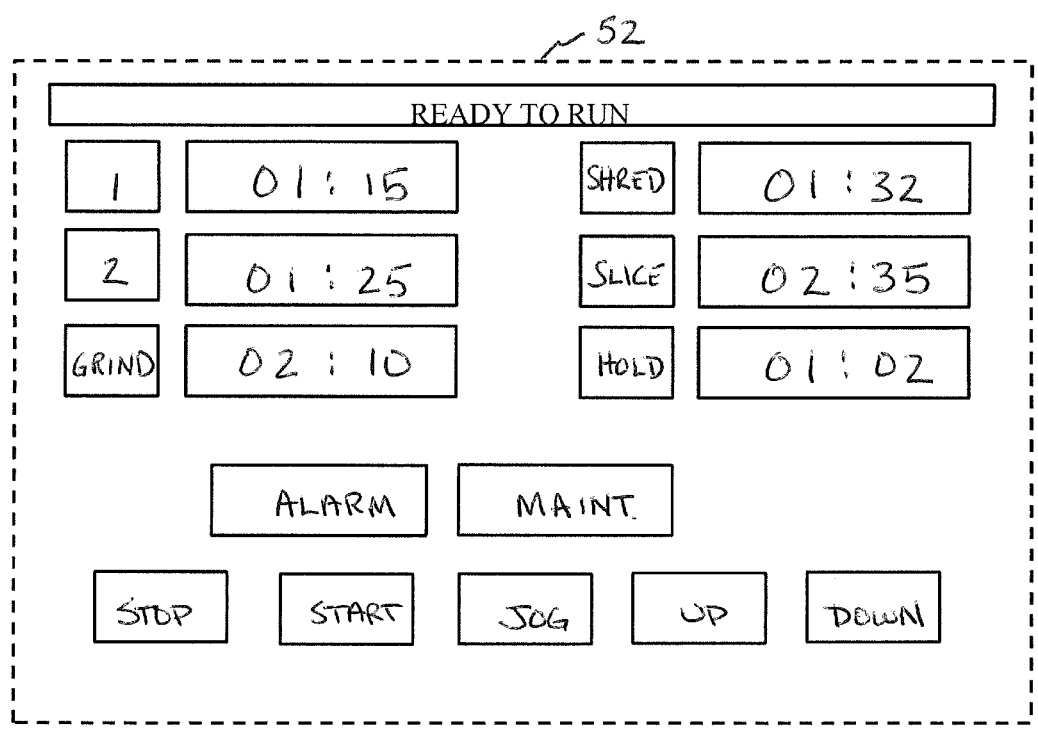

FIG. 15 shows another interface screen in which custom speeds have been defined for specific types of mixing operations (e.g., Grind, Shred, Slice).

The HMI of the current mixing machine enables the machine to display a message, and graphically tell the operator what to do (e.g., what action to take). This enhances the communication to the operator and is more efficient, saving time and reducing operator errors.

In addition, the controller of the machine may be configured such that the HMI can be used by the operator (or person programming the recipe) to view the machine recipes in their entirety. In the past, without the dynamic HMI described herein, recipes could only be viewed one line or step in the recipe at a time. The full recipe viewing is a more intuitive way of communicating the information, saving time and reducing errors.

As seen in FIG. 11A, the main interface screen includes displayed bowl UP and bowl DOWN buttons triggerable by the operator for movement of the bowl support (e.g., via a prime mover linked to the bowl support). The controller, associated with the prime mover and the user interface display, may be configured such that, during triggering of the bowl support movement input to move the bowl support from the raised position to the lowered position, an interrupt is generated (automatically by the controller) and a bowl condition message is automatically displayed on the display (e.g., as a pop-up window message or scrolling message per FIG. 12) advising an operator to unlock a bowl on the bowl support. This provides a convenience feature for the operator to unlock before the bowl is fully lowered.

The prime mover may be a linear actuator with potentiometer to track the actuator position (and thus bowl support position), or another sensor may be provided to track actuator position or bowl support position directly, and the controller may be configured to trigger the interrupt when the potentiometer indicates that the bowl support has moved down to a specified position between the raised position and the lowered position. A bowl support stroke distance is defined as a vertical distance between the raised position and the lowered position, and the specified position may be at a set distance below the raised position, wherein the set distance is between about 40% and about 60% of the bowl support stroke distance.

The mixing machine may include a sensor for sensing whether the bowl is locked on the support, and the controller may be configured to prevent further downward movement of the bowl support from the specified position unless the sensor indicates that the bowl is unlocked. If the bowl is pivotably mounted to the bowl support for movement between a closed position and an open position, the sensor identifies the open position as the bowl being unlocked. In addition, the controller may be configured such that an operator must provide a bowl condition message acknowledgment input via the user interface (e.g., pressing a displayed interface button that states "Bowl Is Unlocked") to enable further downward movement of the bowl support from the specified position.

The mixing implements for the machine may include enhanced sanitation and cleanability by utilizing stainless steel connections, hubs and/or inserts eliminating the need for overpaint or other coatings, eliminating bolts over product zone and/or eliminating cavities. Weight reductions may also be achieved. For example, a whip tool in which a stainless steel weldment forms the connection hub at the top of the tool, as opposed to prior carbon steel and aluminum bolted assemblies, may be provided.

It is to be clearly understood that the above description is intended by way of illustration and example only, is not intended to be taken by way of limitation, and that other changes and modifications are possible.

The invention claimed is:

1. A food mixing machine, comprising:
   a mixer body including a column and a head extending from the column;
   a bowl support mounted for movement along the column between a lowered position away from the head and a raised position toward the head;
   at least one sensor for indicating location of the bowl support along the column;
   a prime mover connected for powered movement of the bowl support back and forth between the raised position and the lowered position under operator control via a bowl drive actuation input;
   a controller configured such that, during triggering of the bowl drive actuation input to move the bowl support toward the lowered position, the controller generates an interrupt when the at least one sensor indicates that the bowl support has moved down to a specified position between the raised position and the lowered position.

2. The food mixing machine of claim 1, further comprising a user interface located on the food mixing machine, wherein the controller is configured to initiate an unlock bowl message, that is automatically communicated via the user interface, when the at least one sensor indicates that the bowl support has moved down to the specified position.

3. The mixing machine of claim 2, wherein the controller is configured such that an operator must provide an input, via the user interface, to enable further downward movement of the bowl support from the specified position.

4. The mixing machine of claim 1, including a further sensor for sensing whether the bowl is locked on the bowl support, wherein the controller is configured such that, subsequent to generation of the interrupt, further downward movement of the bowl support from the specified position is prevented unless the further sensor indicates that the bowl is unlocked.

5. The mixing machine of claim 4, wherein the bowl is pivotably mounted to the bowl support for movement between a closed position and an open position, and the further sensor identifies the open position as the bowl being unlocked.

6. A food mixing machine, comprising:
   a mixer body including a column and a head extending from the column;
   a bowl support mounted for powered movement along the column between a lowered position away from the head and a raised position toward the head;
   a user interface located on the mixing machine;
   a control system configured such that, during powered movement of the bowl support toward the lowered position, the control system:
   (i) generates an interrupt when the bowl support has moved down to a specified position between the raised position and the lowered position;
   and/or
   (ii) initiates an unlock bowl message, that is communicated via the user interface.

7. The mixing machine of claim 6, wherein the control system is configured such that, subsequent to generation of the interrupt, further downward movement of the bowl support from the specified position is prevented unless the control system identifies that the bowl is unlocked.

8. The mixing machine of claim 7, wherein the bowl is pivotably mounted to the bowl support for movement between a closed position and an open position, and the control system identifies the open position as the bowl being unlocked.

9. The mixing machine of claim 6, wherein the control system is configured such that an operator must provide an input, via the user interface, to enable further downward movement of the bowl support from the specified position.

10. A method of operating a food mixing machine that includes a mixer body including a column and a head extending from the column, and a bowl support mounted for movement along the column between a lowered position away from the head and a raised position toward the head, the method comprising:
    during powered downward movement of the bowl support toward the lowered position, interrupting the downward movement of the bowl support based upon the bowl support reaching a certain location between the raised position and the lowered position.

11. The method of claim 10, further comprising:
    outputting an unlock bowl message via a user interface of the food mixing machine.

* * * * *